United States Patent
Schuller

(10) Patent No.: US 8,469,394 B2
(45) Date of Patent: Jun. 25, 2013

(54) HEIGHT ADJUSTABLE VEHICLE SEAT WITH SIDE AIRBAG AND MOTOR VEHICLE WITH SUCH A SEAT

(75) Inventor: Hans Werner Schuller, Dachau (DE)

(73) Assignee: Autoliv Development AB, Vargarda (SE)

( * ) Notice: Subject to any disclaimer, the term of this patent is extended or adjusted under 35 U.S.C. 154(b) by 83 days.

(21) Appl. No.: 13/262,333

(22) PCT Filed: Mar. 29, 2010

(86) PCT No.: PCT/EP2010/001968
§ 371 (c)(1),
(2), (4) Date: Sep. 30, 2011

(87) PCT Pub. No.: WO2010/115536
PCT Pub. Date: Oct. 14, 2010

(65) Prior Publication Data
US 2012/0018988 A1    Jan. 26, 2012

(30) Foreign Application Priority Data
Apr. 8, 2009   (DE) .......................... 10 2009 016 606

(51) Int. Cl.
*B60R 21/207*   (2006.01)
*B60R 21/239*   (2006.01)

(52) U.S. Cl.
USPC ...................... 280/730.2; 280/739; 297/216.1; 297/344.12

(58) Field of Classification Search
USPC ................. 280/730.1, 730.2, 739; 297/216.1, 297/216.13, 344.12, 344.13, 464
See application file for complete search history.

(56) References Cited

U.S. PATENT DOCUMENTS

| 5,556,128 | A * | 9/1996 | Sinnhuber et al. .......... 280/730.2 |
| 5,695,242 | A * | 12/1997 | Brantman et al. .......... 297/216.1 |
| 7,168,736 | B2 * | 1/2007 | Tanase et al. ............... 280/730.2 |
| 7,207,596 | B2 * | 4/2007 | Linder et al. ................ 280/730.2 |
| 7,475,904 | B2 * | 1/2009 | Hofmann et al. ............. 280/739 |

(Continued)

FOREIGN PATENT DOCUMENTS

| DE | 191 33 968 A1 | 2/2003 |
| DE | 10 2008 010 322 A1 | 8/2009 |

(Continued)

OTHER PUBLICATIONS

International Search Report—Jun. 16, 2010.

*Primary Examiner* — Eric Culbreth
*Assistant Examiner* — Barry Gooden, Jr.
(74) *Attorney, Agent, or Firm* — Brinks, Hofer, Gilson & Lione

(57) ABSTRACT

Disclosed is a vehicle seat (10) for a motor vehicle having a backrest (14) with a seat-mounted side airbag (20) having a first side wall (22) facing the occupant and a second side wall (24) facing the outside of the vehicle. The side airbag (20) is located on the side of the backrest (14) facing the outside of the vehicle, and the side airbag (20) includes a first ventilation opening (30) in the second side wall, the ventilation opening being at least throttled on lying against an object, so that a ventilation of the airbag is adapted as a function of the size of the occupant. The vehicle seat (10) is height adjustable so that, depending on the height adjustment of the vehicle seat, the first ventilation can be closed by the inner structure of the vehicle.

15 Claims, 7 Drawing Sheets

U.S. PATENT DOCUMENTS

| | | | |
|---|---|---|---|
| 7,819,421 B2 * | 10/2010 | Naito et al. | 280/730.2 |
| 7,891,704 B2 * | 2/2011 | Taguchi et al. | 280/739 |
| 7,988,188 B2 * | 8/2011 | Zauritz et al. | 280/730.2 |
| 8,123,248 B2 * | 2/2012 | Yamane | 280/739 |
| 8,246,076 B2 * | 8/2012 | Schmidt et al. | 280/730.2 |
| 8,322,747 B2 * | 12/2012 | Shankar | 280/729 |
| 2002/0047253 A1 | 4/2002 | Rasch et al. | |
| 2003/0168836 A1 * | 9/2003 | Sato et al. | 280/730.2 |
| 2004/0021304 A1 * | 2/2004 | Tanase et al. | 280/729 |
| 2004/0130127 A1 * | 7/2004 | Kurimoto et al. | 280/729 |
| 2005/0023808 A1 * | 2/2005 | Sato et al. | 280/730.2 |
| 2005/0184493 A1 | 8/2005 | Hofmann et al. | |
| 2006/0012155 A1 | 1/2006 | Shaner et al. | |
| 2006/0076759 A1 * | 4/2006 | Tanase et al. | 280/730.2 |
| 2006/0196715 A1 * | 9/2006 | Fujishiro et al. | 180/271 |
| 2007/0164546 A1 * | 7/2007 | Kai et al. | 280/730.2 |
| 2007/0182135 A1 * | 8/2007 | Kai et al. | 280/730.2 |
| 2007/0228699 A1 * | 10/2007 | Bederka et al. | 280/730.2 |
| 2007/0290488 A1 * | 12/2007 | Taguchi et al. | 280/730.2 |
| 2008/0106128 A1 * | 5/2008 | Kashiwagi | 297/216.1 |
| 2008/0185824 A1 * | 8/2008 | Sato | 280/730.2 |
| 2009/0160166 A1 * | 6/2009 | Kataoka et al. | 280/730.2 |
| 2010/0140906 A1 * | 6/2010 | Honda et al. | 280/730.2 |
| 2010/0194084 A1 * | 8/2010 | Zauritz et al. | 280/730.2 |
| 2012/0043741 A1 * | 2/2012 | Yamamoto | 280/730.2 |

FOREIGN PATENT DOCUMENTS

| | | |
|---|---|---|
| DE | 10 2009 016 606 A1 | 10/2010 |
| EP | 1 923 275 A3 | 5/2008 |
| WO | WO 2009/008221 A1 | 1/2009 |

* cited by examiner

HEIGHT ADJUSTABLE VEHICLE SEAT WITH SIDE AIRBAG AND MOTOR VEHICLE WITH SUCH A SEAT

CROSS REFERENCE TO RELATED APPLICATIONS

This application claims priority to German Patent Application No. 10 2009 016 606.8, filed Apr. 8, 2009 and PCT/EP2010/001968, filed Mar. 29, 2010.

TECHNICAL FIELD OF THE INVENTION

The invention relates to a vehicle seat for a motor vehicle with a side airbag and to a motor vehicle with such a vehicle seat.

BACKGROUND OF THE INVENTION

The use of side airbags is widespread in vehicle technology. Such side airbags serve to protect the occupant to whom they are allocated in the case of a side impact or in the case of an accident in which the vehicle rolls over. For this function, the side airbag is arranged in or on the side bolster of the backrest of the motor vehicle seat or in the lateral structure of the motor vehicle, and in the case of an accident expands between the occupant and the vehicle structure, generally resting against the vehicle structure. The side airbag has a ventilation opening, so that, on impact of the occupant, gas can escape from the interior of the airbag through this ventilation opening and thereby impact energy is dissipated. Absent such a ventilation opening, the occupant would rebound back into the interior of the vehicle from the impact surface of the side airbag, which of course is not desired.

The problem exists that with given airbag volume and with given gas generator output, the size of the ventilation opening would have to be tuned in relation to the weight of the occupant, in order to achieve an ideal protective effect for the respective occupant. In the case of a heavy occupant, the ventilation opening would have to be relatively small, so that the side airbag remains relatively hard and the occupant is prevented from striking through onto the vehicle structure. In the case of a light occupant, the ventilation opening would have to be relatively large, in order to make the side airbag softer.

To solve the problem which has just been mentioned, U.S. Publication No. 2005/0184493 A1 proposes providing a first ventilation opening in a side wall of the side airbag, namely in the side wall pointing towards the inside, which also forms the impact surface. The position of this ventilation opening is selected so that it is covered by the shoulder region of a tall occupant, but is not covered by the shoulder region of a short occupant. If a tall, and hence generally heavier, occupant strikes onto the side airbag, the shoulder region blocks or throttles the ventilation opening and the side airbag remains accordingly hard. If, on the other hand, a short, and hence generally lighter, occupant strikes onto the impact surface of the side airbag, then this ventilation opening remains open and the side airbag shows a correspondingly soft behaviour. An adaption of the ventilation therefore takes place as a function of the size of the occupant.

A disadvantage here is firstly that the ventilation opening must be hit relatively precisely, in particular even when the occupant is not in his standard sitting position (out of position). A further disadvantage is that the adaptation of the ventilation takes place substantially "digitally", which means that the ventilation is either open or closed. Graduations lying therebetween are relatively difficult to realise.

SUMMARY OF THE INVENTION

Starting from this, the present invention sets itself the problem of improving the prior art to the effect that the ventilation adaptation is substantially independent of the sitting position of the occupant at the onset of the accident.

According to the invention, the ventilation opening, through which the degree of hardness of the side airbag is set, is situated on the side wall of the side airbag pointing outwards, i.e. towards the side wall of the vehicle. It is not the shoulder region of the occupant, but rather the door of the vehicle, namely the region below the door shoulder, which therefore serves for the possible closing of this first ventilation opening. The control factor here as to whether the side airbag behaves in a hard or a soft manner in the case of a side impact is not directly the body size of the occupant, but rather the vertical adjustment of the vehicle seat, i.e. only indirectly the body size of the occupant. This means that the invention obligatorily presupposes a height adjustable vehicle seat.

If a height adjustability is present for the vehicle seat, then this is generally used at least on the driver's side, with a tall driver adjusting the seat low and a short driver adjusting the seat high. The position of the first ventilation opening can therefore be easily selected so that it comes to lie above the door shoulder of the door in the highest seat position and below the door shoulder of the door in the lowest seat position of the vehicle, when the side airbag is in its completely deployed state. This first ventilation opening is therefore closed by abutment against the door in the case of a tall occupant, i.e. with a low set seat, but not in the case of a short occupant, i.e. with a high set vehicle seat. This functions very reliably and independently of the actual sitting position of the occupant during the accident, and the sealing effect by the rigid structure of the door is very high. A further advantage is that a direct flowing of hot gases against the occupant is ruled out.

In preferred embodiments, the ventilation opening consists of several single openings, whereby a very fine tuning of the airbag hardness can be achieved.

The invention will now be explained in further detail by ways of preferred embodiments with reference to the appended figures.

DETAILED DESCRIPTION OF EXEMPLARY EMBODIMENTS

Figure 1:
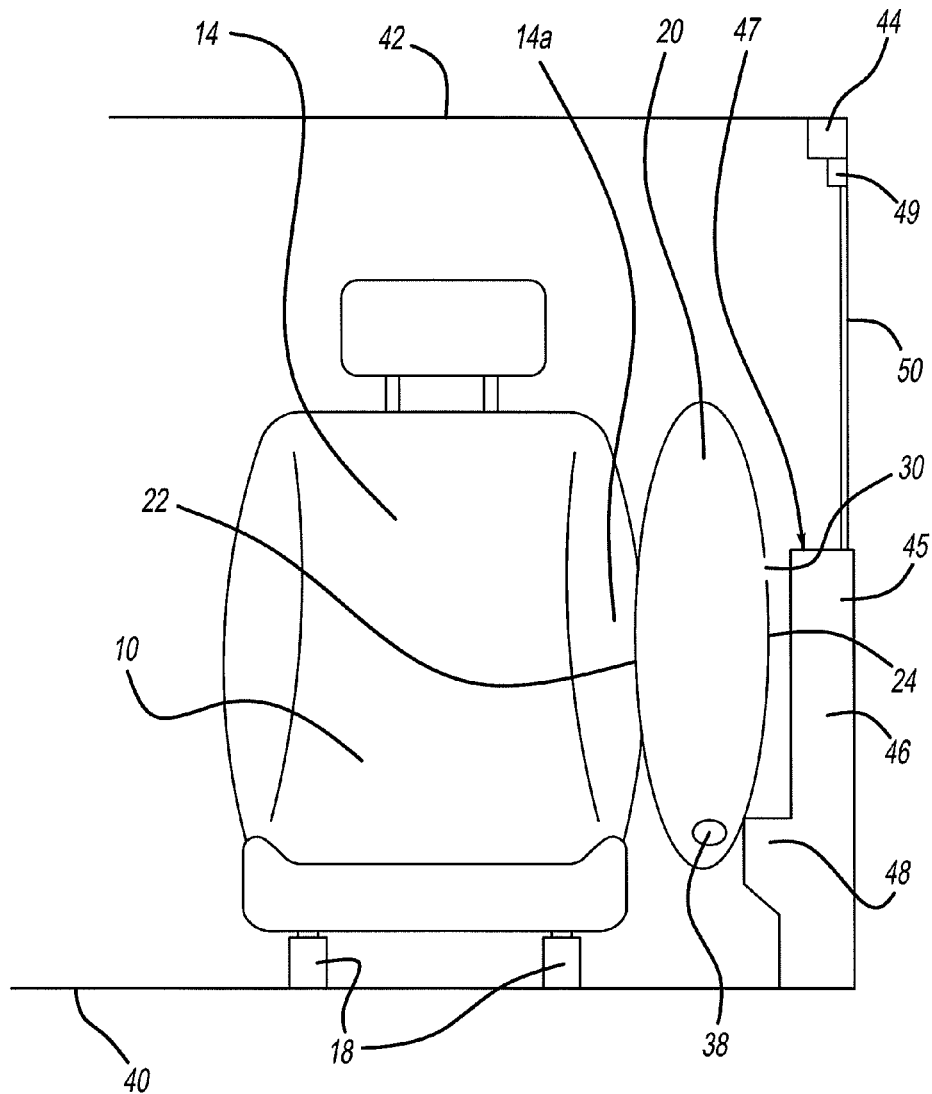
FIG. 1 shows a schematic view onto a driver's seat, mounted in a motor vehicle, with a side airbag, wherein this side airbag is illustrated in completely deployed, but undisturbed state.

FIG. 1 shows a vehicle seat 10, namely a driver's seat, in the mounted state in the motor vehicle. The vehicle floor 40, the vehicle roof 42 and the roof rail 44 can be seen schematically. On the outside, adjacent to the vehicle seat, the vehicle door 45 is situated, which comprises a main body 46 extending up to the door shoulder 47, and a window frame 49, of which an upper section can be seen here. When the side window 50 is closed, it extends between the door shoulder 47 and the window frame 49. In addition, a storage compartment 48 can be seen, which is formed on the main body 46 of the vehicle door 45.

The vehicle seat 10 has a schematically illustrated height adjustment 18, by means of which the vertical position of the vehicle seat 10 can be set with respect to the vehicle floor 40. FIG. 1 shows the vehicle seat 10 in its lowest adjustment. Further, a side airbag 20 in its completely deployed state is illustrated in FIG. 1. In this completely deployed state, the side airbag 20 extends from the outer side bolster 14a of the backrest 14 forwards and substantially parallel to the vehicle door 45. The side airbag 20 is filled by a gas generator which is, however, not illustrated here.

The side airbag 20 has a first side wall 22 pointing towards the occupant and a second side wall 24 pointing towards the outside. The first side wall 22 therefore serves as an impact surface and the second side wall 24 serves as a support surface. Two ventilation openings are provided, namely the first ventilation opening 30 and the second ventilation opening 38. The first ventilation opening 30 serves to control the internal pressure, i.e. the hardness, of the side airbag 20 on impact of an occupant onto the impact surface of the first side wall 22. For this, the first ventilation opening 30 is located on the outwardly-pointing second side wall 24 in the region of the height of the door shoulder 47. As can be seen from FIG. 1, the first ventilation opening 30 is arranged in the second side wall 24 of the side airbag 20 so that with a completely deployed airbag 20 and with a height adjustment of the vehicle seat in its lowest position, it is situated below the door shoulder 47 of the vehicle door 55. The second ventilation opening 38 is situated in a front region, approximately in the transition region between the first side wall 22 and the second side wall 24 and is arranged so that it remains open in every case.

Figure 2:
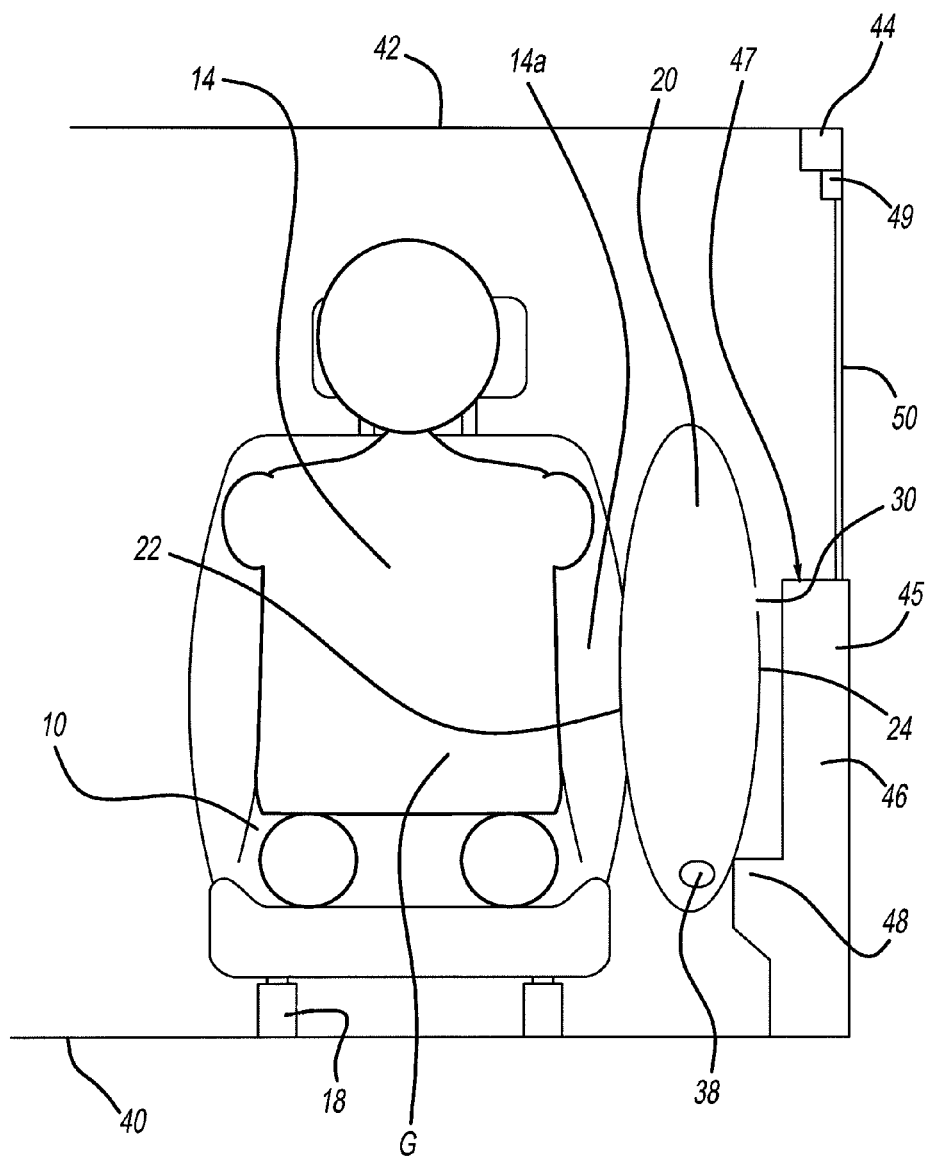
FIG. 2 shows the view of FIG. 1, with a tall occupant sitting on the vehicle seat.

FIG. 2 shows the view of FIG. 1, with a tall occupant G sitting on the vehicle seat 10.

Figure 3:
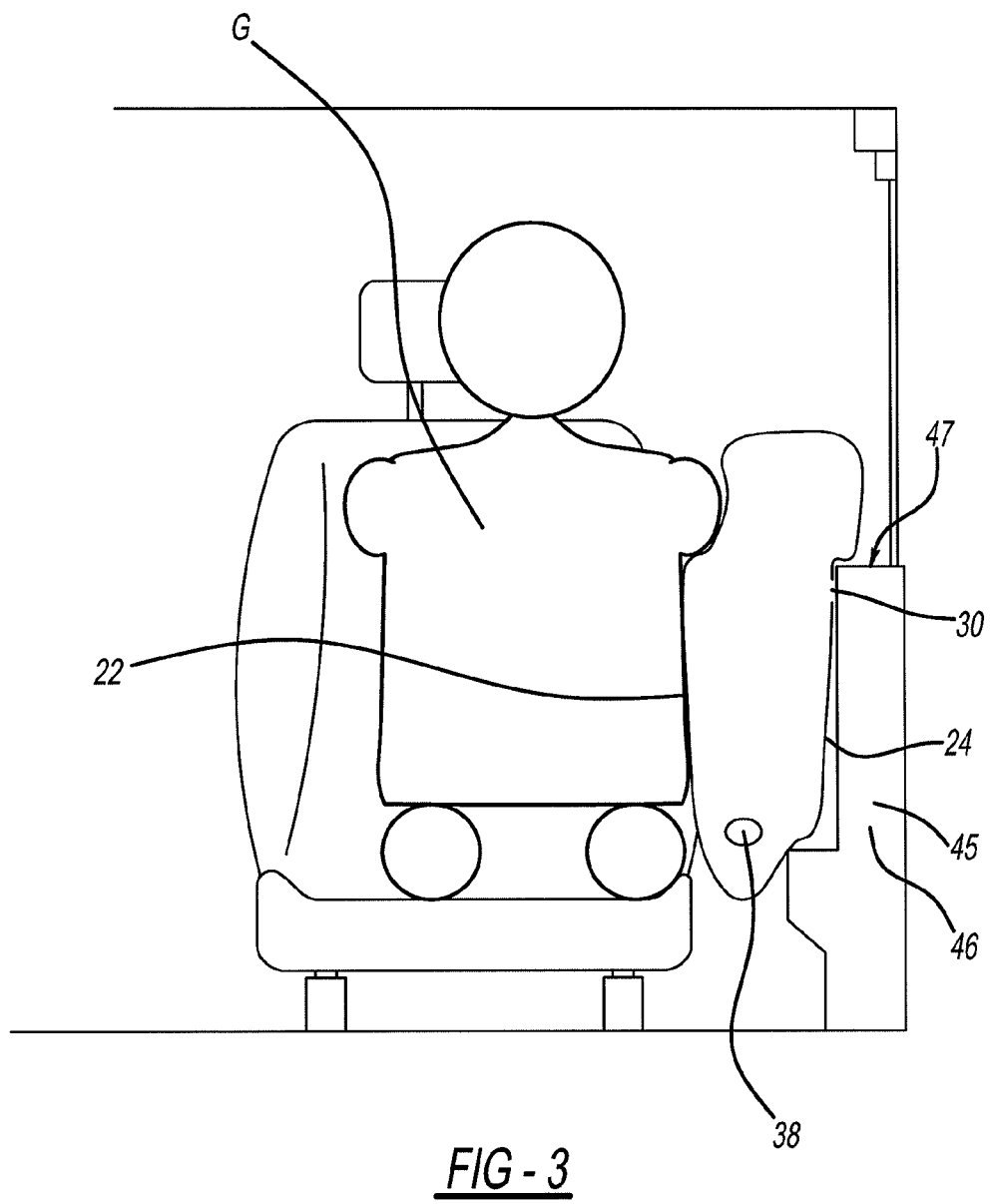
FIG. 3 shows the view of FIG. 2 after the occupant has struck the side airbag.

FIG. 3 shows the view of FIG. 2, after the tall occupant, as the result of an accident, has struck onto the first side wall 22 of the side airbag 20 and the latter is supported by the vehicle door 45, namely its main body 46, by means of its second side wall 24. Owing to the position of the first ventilation opening 30 described above, the latter strikes onto the outer surface of the main body 46 of the vehicle door 45 below the door shoulder 47 and is thereby fully blocked or at least throttled. Because the main body 46 of the vehicle door 45 is a very rigid body, an almost complete blocking of the first ventilation opening 30 is practically always given, independent of the exact sitting position of the occupant. In this case, the ventilation of the side airbag 20 takes place exclusively via the second ventilation opening 38, whereby the side airbag 20 remains relatively hard.

Figure 4:
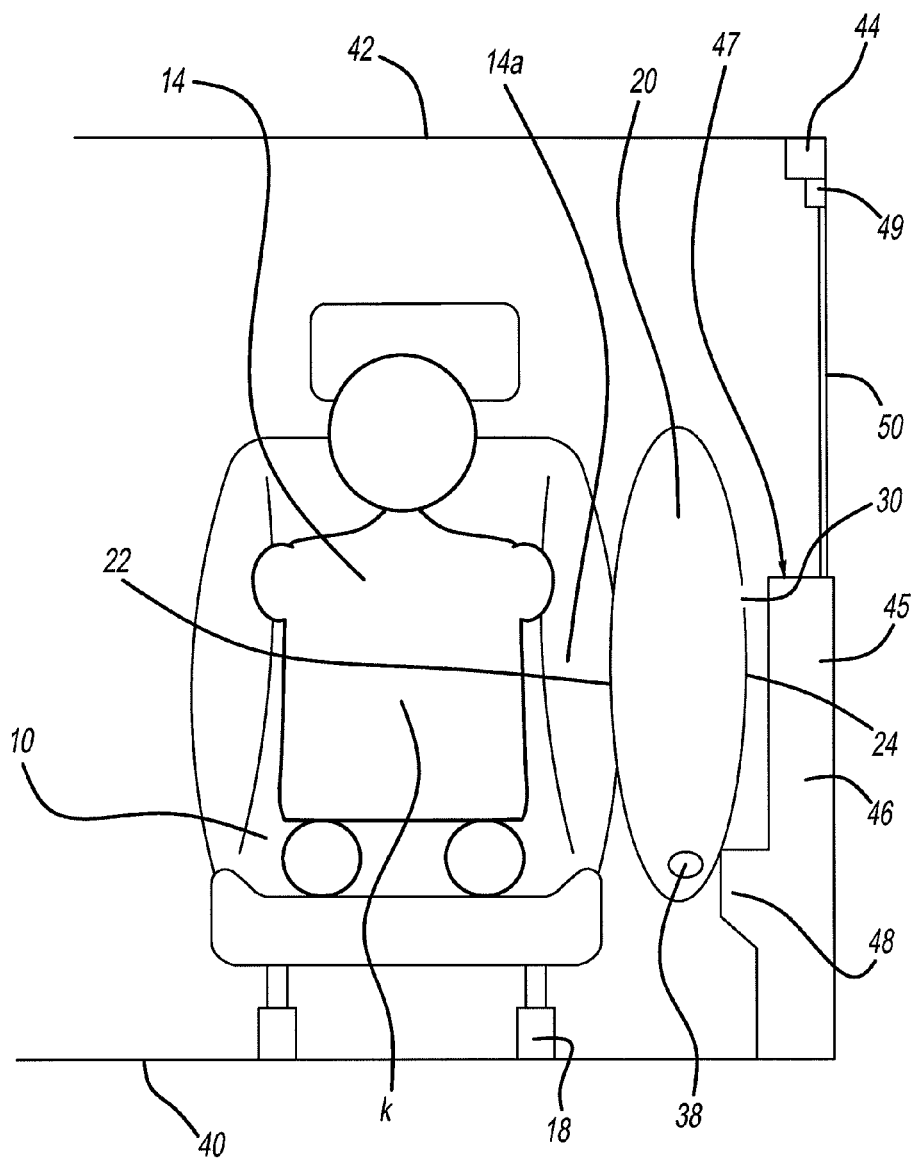
FIG. 4 shows the view of FIG. 1 with a short occupant sitting on the vehicle seat, wherein the vehicle seat is situated in an upper vertical adjustment.
Figure 5:
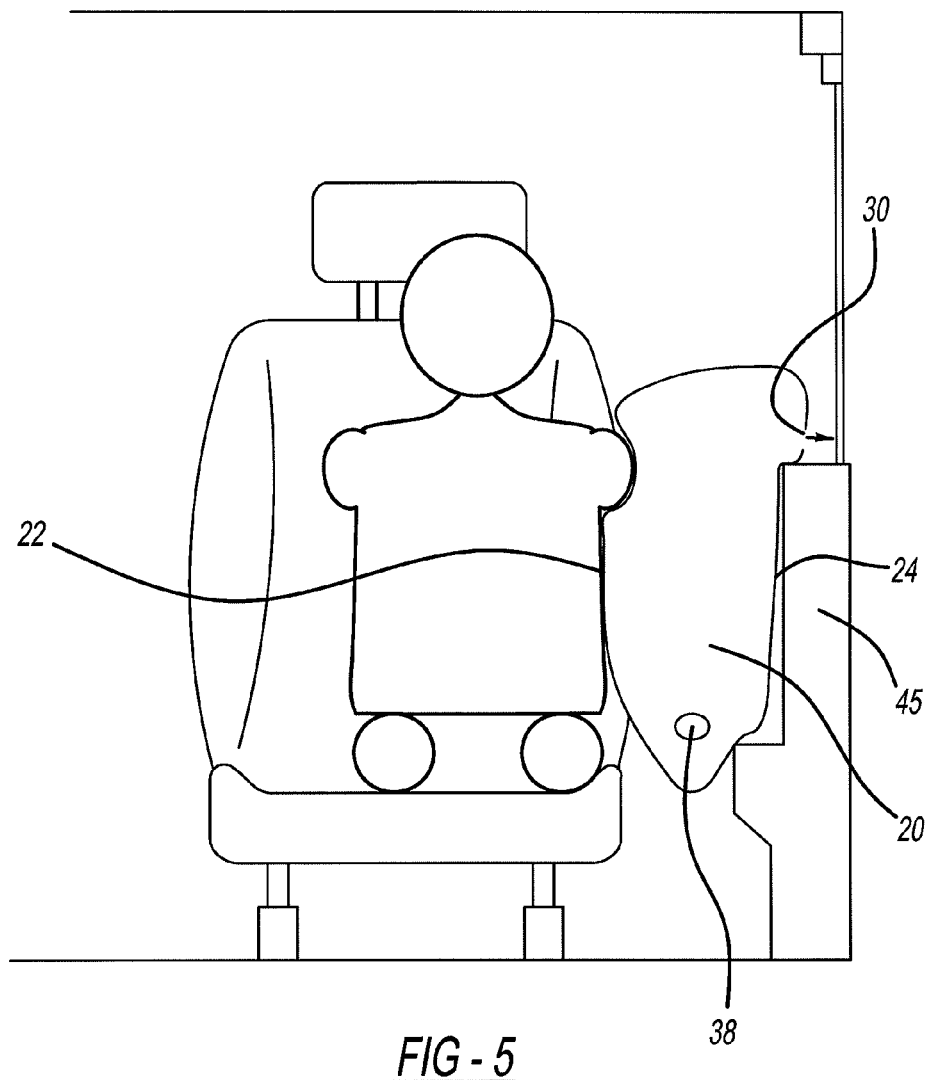
FIG. 5 shows the view of FIG. 4 after the occupant has struck the side airbag.

FIG. 4 shows the view of FIG. 2, when a short occupant K is sitting on the vehicle seat 10. The vehicle seat 10 is set into an upper position corresponding to the size of the occupant K, as can also be seen from the illustration of the schematically illustrated height adjustment 18. Through this raised position of the vehicle seat 10, compared with the state shown in FIG. 2, the first ventilation opening 30 is situated above the door shoulder 47. If, as illustrated in FIG. 5, the short occupant K strikes onto the first side wall 22 of the side airbag 20 and the latter rests by means of its second side wall 24 against the main body 46 of the vehicle door 45, then the first ventilation opening 30 does not come in contact with the main body 46 of the vehicle door 45 and therefore remains open, because the side window is offset outwards with respect to the inwardly pointing surface of the main body 46 and in addition is generally destroyed in the case of a side impact, so that it does not offer any abutment surface in this case. The first ventilation opening 30 therefore does not come into abutment or only with very little force—if the side window 50 is reached— against a surface. Hereby, gas flows off both through the second ventilation opening 38 and also through the first ventilation opening 30, and the side airbag 20 becomes soft accordingly.

From the preceding illustration of the invention, it can be seen that the second ventilation opening, which always has the same effective cross-section, serves for the rough tuning of the side airbag and therefore is primarily adjusted to the volume of the side airbag and the gas generator output, but not to the respective vehicle occupant. The first ventilation opening serves for the fine tuning of the side airbag as a function of the size of the occupant who is to be protected. The rough tuning and the fine tuning are fully decoupled from each other.

It can further be seen from the preceding illustration of the invention that it only functions optimally when the occupant who is to be protected carries out the applicable seat height adjustment for his body size. This is in fact generally the case, but particularly on the passenger side it can happen that the occupant does not carry out the applicable seat height adjustment, in particular that a short occupant sits too low, and in the case of an accident the first ventilation opening is therefore positioned below the door shoulder. Owing to the low weight of the short occupant, the first ventilation opening is, however, pressed with a smaller force against the door than by a tall occupant, so that it is generally not fully closed, which attenuates the effect of the "incorrect use". As the side walls of the side airbag have a convex shape, the force transmission between the door and the second side wall 24 of the side airbag is largest in the middle of the second side wall 24. It can therefore be advantageous to arrange the first ventilation opening 30 eccentrically, i.e. in a margin region of the second side wall 24, in order to intensify the effect described above, namely that the first ventilation opening is not fully closed when it is pressed by a short (and light) occupant against the door.

Figure 6:
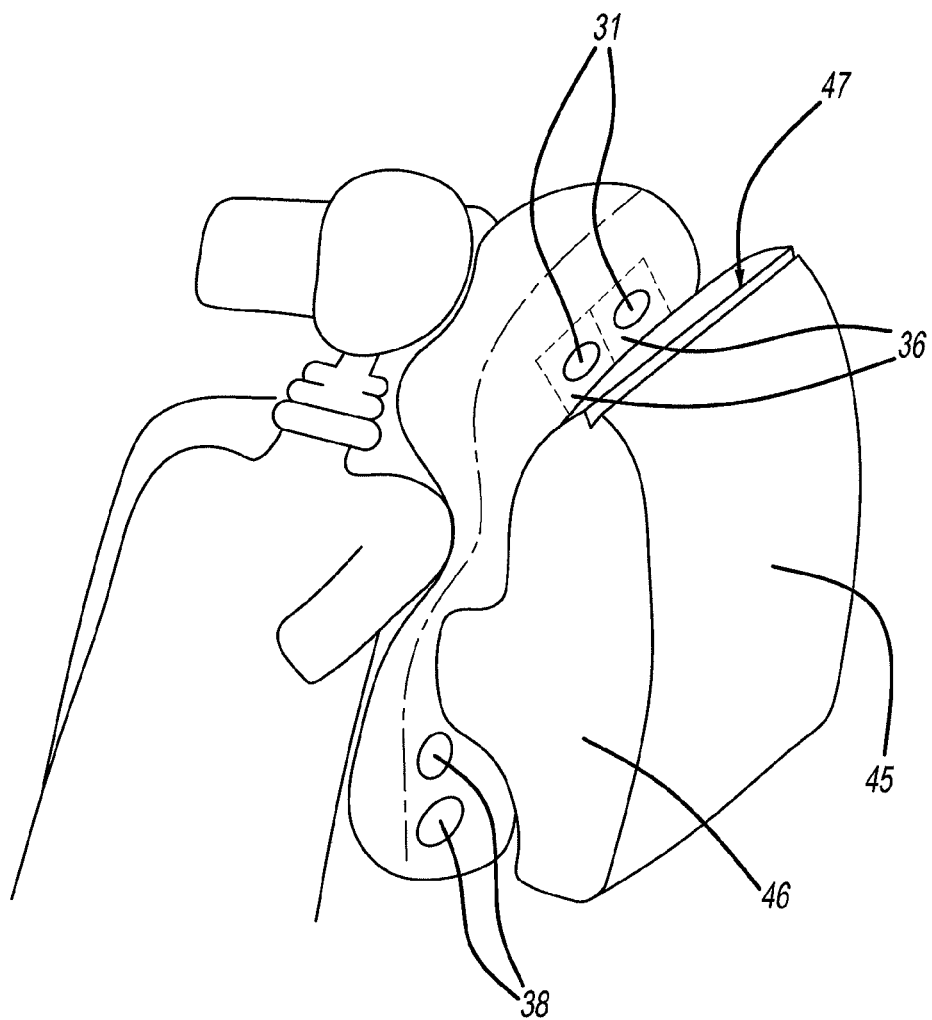
FIG. 6 shows a perspective illustration of a situation-approximately corresponding to the situation of FIG. 5.
Figure 8:
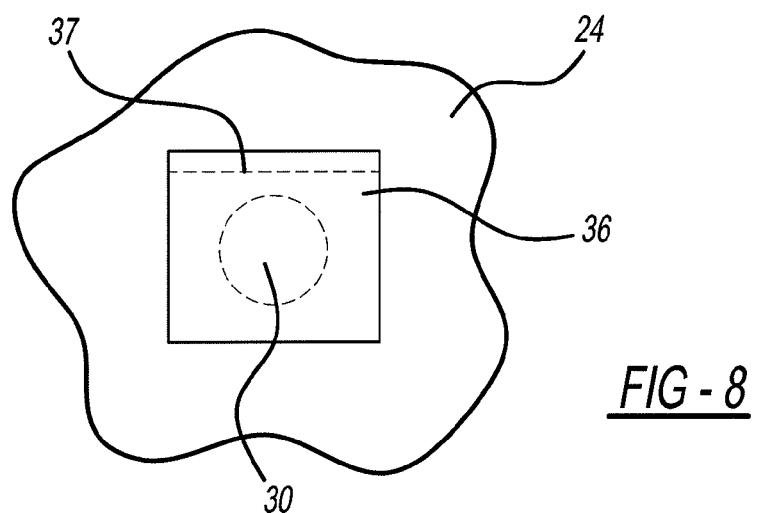

FIG. 6 shows a situation which corresponds substantially to the one of FIG. 5, in a perspective illustration. It can be seen from this figure that the first ventilation opening 3 can also consist of several single openings 31, here namely two. The same also applies to the second ventilation opening 38. It is further indicated in FIG. 6 that the first ventilation opening 30, here therefore the two single openings 31, can be covered with a covering cloth 36, which improves the sealing effect in the case of an abutment against the vehicle door 45. Such a covering cloth is also illustrated again in FIG. 8, from which it can also be seen that this covering cloth, which covers the first ventilation opening 30, is sewn by means of preferably only one fastening seam 37 to the second side wall 24. The advantage of such a covering cloth 36 is in particular that the first ventilation opening is also reliably closed when it strikes onto the vehicle door precisely in the region of the door shoulder, i.e. "on the edge". In this case, without such a covering cloth, a "half open" state occurs which is difficult to define.

Figure 7:
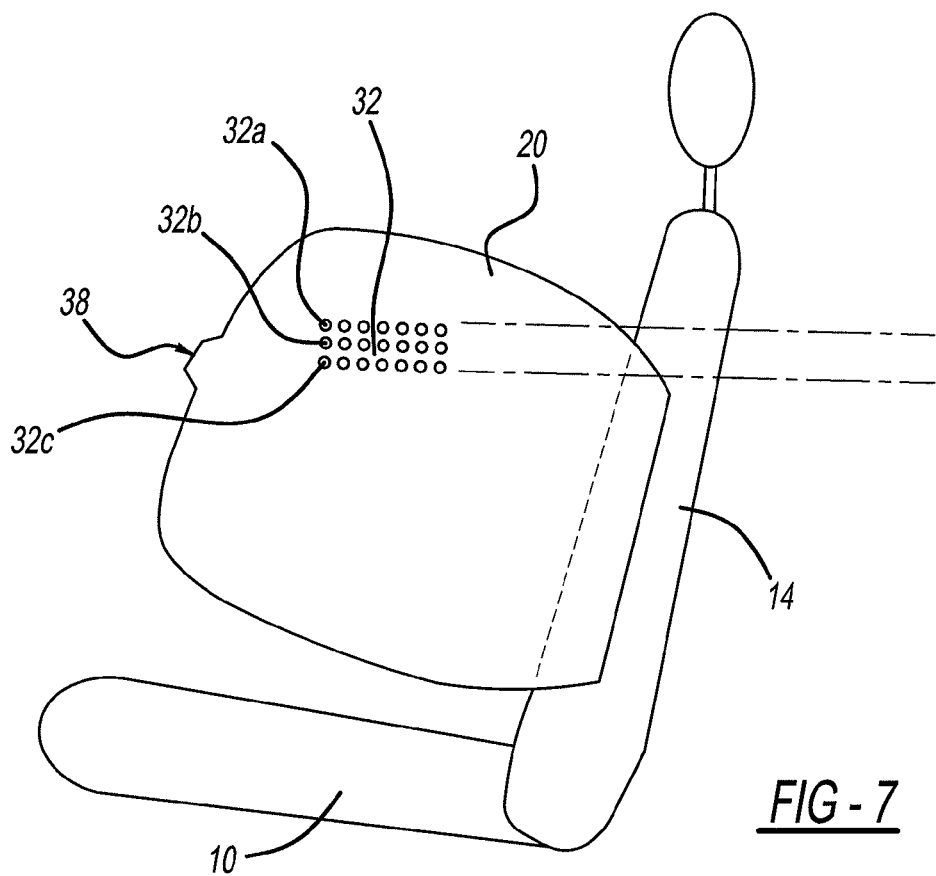
FIG. 7 shows a lateral view onto a vehicle seat with a side airbag and FIG. 8 shows a ventilation opening which is covered by a covering cloth.

FIG. 7 shows a vehicle seat 10 with a side airbag 20 in a side view. It can be seen from this figure that the first ventilation opening 30 can also be embodied as a field 32 of single openings with several rows, in the example embodiment shown with three rows 34a, 34b, and 34c. The height of this field 32 of single openings corresponds preferably substantially to the height adjustability of the vehicle seat. The dot-and-dash lines in FIG. 7 show here the relative position of the door shoulder 47 in the uppermost and lowermost adjustment of the vehicle seat 10. Through such an arrangement, a very fine tuning of the airbag hardness is obtained as a function of the vertical position of the vehicle seat and therefore also as a function of the size of the vehicle occupant. The desired effect of a finer graduation, compared with a sole single opening forming the ventilation opening, can also already be achieved by two single openings which are arranged substantially on top of one another. However, a field of single openings improves both the fineness of the graduation and also the reproducibility.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A vehicle seat (10) for a motor vehicle, the vehicle seat being height adjustable relative to the vehicle between a lowermost position and an uppermost position by a height difference, the vehicle seat comprising: a backrest (14),
   a side airbag (20) mounted on the backrest (14) and having a first side wall (22) facing a seat occupant and a second side wall (24) facing an outside of the vehicle, the side airbag (20) being located on a side of the backrest (14) facing the outside of the vehicle, the side airbag (20) comprising a first ventilation opening (30) in the second side wall, the ventilation opening being obstructed during a contact with an object that is immovable relative to the vehicle and arranged at a height that makes contact with a greater area of the ventilation opening when the seat is in the lowermost position than when the seat is in the uppermost position.

2. The vehicle seat according to claim 1, wherein the first ventilation opening (30) is formed by at least two individual openings (31) arranged vertically offset from one another.

3. The vehicle seat according to claim 1, wherein the first ventilation opening (30) is an array (32) of a plurality of individual openings.

4. The vehicle seat according to claim 1, wherein the first ventilation opening comprises a plurality of individual openings with an uppermost and a lowermost opening, a vertical distance between the uppermost and the lowermost opening approximately corresponding to the height difference.

5. The vehicle seat according to claim 1, wherein the first ventilation opening is located in an upper half of the second side wall (24).

6. The vehicle seat according to claim 1, further comprising at least a second ventilation opening (38) remote from the first ventilation opening, said second ventilation opening being permanently open.

7. The vehicle seat according to claim 6, wherein the second ventilation opening (38) is located in an intermediate area between the first and the second side wall (22, 24).

8. The vehicle seat according to claim 1, wherein the height difference of the vehicle seat (10) is at least 7 cm.

9. The vehicle seat according to claim 8, wherein the height difference of the vehicle seat (10) is at least 10 cm.

10. The vehicle seat according to claim 1, further comprising a covering cloth (36) covering the first ventilation opening (30) and holding the first ventilation opening closed when the covering cloth abuts the object with at least a lower edge.

11. The vehicle seat according to claim 10, further comprising a connecting line (37) attaching the covering cloth (36) to the second side wall (24).

12. A motor vehicle comprising a vehicle seat (10) according to claim 1.

13. The motor vehicle according to claim 12, further comprising a door shoulder next to the vehicle seat (10), the door shoulder extending above at least a first portion of the first ventilation opening (30) when the vehicle seat (10) is in the lowermost position while the side airbag is completely deployed, and the door shoulder extending above at most a second portion of the first ventilation opening (30), the second portion being smaller than the first portion, when the vehicle seat (10) is in the uppermost position while the side airbag is completely deployed.

14. The motor vehicle according to claim 13, wherein in the lowermost position of the vehicle seat (10) the door shoulder extends above the entire first ventilation opening (30) while the side airbag is completely deployed.

15. The motor vehicle according to claim 13, wherein in the uppermost position of the vehicle seat (10) the entire first ventilation opening (30) is located above the door shoulder (47) while the side airbag is completely deployed.

* * * * *